INVENTOR.
RALPH K. DAY

INVENTOR.
RALPH K. DAY

United States Patent Office

3,521,476
Patented July 21, 1970

3,521,476
METHOD AND APPARATUS FOR MEASURING THERMAL CONDUCTIVITY
Ralph K. Day, 307 W. Harrison St., Maumee, Ohio 43537
Filed Dec. 27, 1966, Ser. No. 604,839
Int. Cl. G01n 33/20
U.S. Cl. 73—15                                10 Claims

ABSTRACT OF THE DISCLOSURE

A method for measuring thermal conductivity utilizing cold flow at the joints between a sample and a heat source and a heat sink. Pressure sufficient to induce cold flow is imposed across the joints after the thermal system has been brought approximately to the temperature of measurement to cause conformation of the surfaces in their form at that temperature. Also apparatus providing the means to impose high pressures under measurement conditions without distortion of the joints. A support system effectively concentrates force at the sample face without applying supports to the thermal system near the sample. Uniform thermal conductivity over the entire area of the joints is enhanced by superimposing on the sample faces shims of material which readily flow under pressure.

---

This invention relates to methods of and apparatus for measuring thermal conductivity by the cut bar method.

Heretofore it has been known to measure thermal conductivity by forming a sample as a right circular cylinder or bar, mounting the sample to minimize random heat loss, as in a vacuum, and establishing a thermal gradient to cause axial flow of heat along the bar. Conveniently a heat source such as an electrical heater in which the power consumption is measured to ascertain heat input is applied to one end of the sample bar and heat is removed from the opposite end is calorimetrically measured. Knowing the heat in, the heat out and the distance and temperature difference for a thermal gradient, thermal conductivity of the bar at its average temperature can be calculated. The cut bar method utilizes cylindrical bars of material of known thermal characteristics and the same cross section as the sample bar on the opposite ends of the sample. Relative thermal conductivity is measured as the inverse ratio of thermal gradients in the different sections of the system by means of thermocouples. In such measurements every plane perpendicular to the axis of the system should be at a uniform temperature and only an insignificant percentage of the heat flowing along the system should be lost by radiation or conduction from the outside surfaces.

The achievement of thermally uniform joints and the avoidance or minimizing of radial heat losses have been major impediments to the utilization of the cut bar method.

An object of this invention is to facilitate thermal conductivity measurements by improved apparatus and procedures.

Another object is to simplify the apparatus and procedures for thermal measurements.

A further object is to avoid irregularities in thermal conductivity across the joints to the sample being measured.

In accordance with the above objects, the invention involves a method of and apparatus for achieving joints between a source of heat, a sample to be measured, and a heat absorber which offer a uniform thermal conductivity across their surface by imposing sufficient pressure on the joints along the longitudinal axis of the system to assure a fit of the surfaces. Where thermal warpage of the surfaces of the joint is substantial cold flow of material is utilized to form uniform heat transfer paths. This can involve forming the bars conducting heat to and from the sample of a material which cold flows at the measurement temperature and pressure, e.g. at 500° C. copper creeps under a pressure of 2000 pounds per square inch. It can also be accomplished by the use of shims of material of good thermal conductivity which is soft and which will flow to conform to the opposed faces of the sample and bar. The thermal path in the shims, even when of high conductivity, should be as short and as uniform in length as is practical. Thus shims are employed of thin material (a few thousandths of an inch) of uniform thickness. Another technique is to employ shims of expanded metal or screening wherein the applied pressure causes the individual elements to flow and conform in a uniform pattern of contact areas between one or both of the faces of the sample and bar.

Advantageously the pressure which induces cold flow is imposed upon the system only after it has been heated to or nearly to its measurement temperature. This avoids work hardening the material prior to the time the surface regions of the bars and sample reach their final form.

The present invention is particularly well adapted to convenient, rapid and accurate measurements and therefore is a practical approach to routine laboratory measurements. In such measurements it is desirable to retain the bars as elements of the apparatus while performing a plurality of tests. Accordingly it is advantageous to employ hardened faces on the bars so they will not cold flow and rely upon cold flow of the shims since the shims can readily be replaced with the introduction of each sample to the apparatus.

Uniform thermal conductivity across a joint is further enhanced by constraining the force from which the pressure causing cold flow is derived to a direction parallel to the axis of the system. Since thermal considerations dictate substantial uncontacted lengths for the bars engaging the sample, the apparatus employed is arranged to enable precise alignment of the bars and sample along their longitudinal axes. The tendency to cock the surfaces of the joints where the force is not exactly aligned with the longitudinal axis of the thermal system is minimized by effectively supporting the system at one or both joints. A gimbal focused at the joint effectively applies force at the joint even though actual support to the bar is remote from the joint. Thus in the example a single gimbal supports the cooler bar and a system for applying compressive force to the bar such that the force is effectively applied at the face of the bar adjacent the sample. Further correction of any cocking tendency can be achieved, where necessary, by employing a gimbal support for the high temperature bar and by focusing that support at the face of the bar adjacent the sample.

The sample is compressed between the ends of the bars of material of known thermal characteristics by mounting the bars on headers oriented to maintain them in vertical alignment. Tie bars join the headers. A coupled set of nut and screw interconnections between one header and the tie bars enable the spacing of the headers to be adjusted. The sample is mounted by separating the headers and their supported bars to permit admission of the sample between adjacent ends of the bars. The set of nuts are rotated to bring the headers toward each other while the bars, interfacial shims (if required), and sample are held in alignment to impose clamping pressure on the thermal test system. Thereafter the system is enclosed, the enclosure evacuated, the measurement temperature established, and hydraulic pressure applied to overcome any misfit between the bars and sample faces by cold flow.

The invention and its objects and features will be more fully appreciated from the following detailed description when read with reference to the accompanying drawings wherein.

In the following description the bars of material of known thermal characteristics along which heat is conducted to and from the sample are termed "thermodes." Measurements are performed in a thermal system comprising a high temperature thermode 6, a sample 7, and a low temperature thermode 8.

Figures 3, 4, 5:
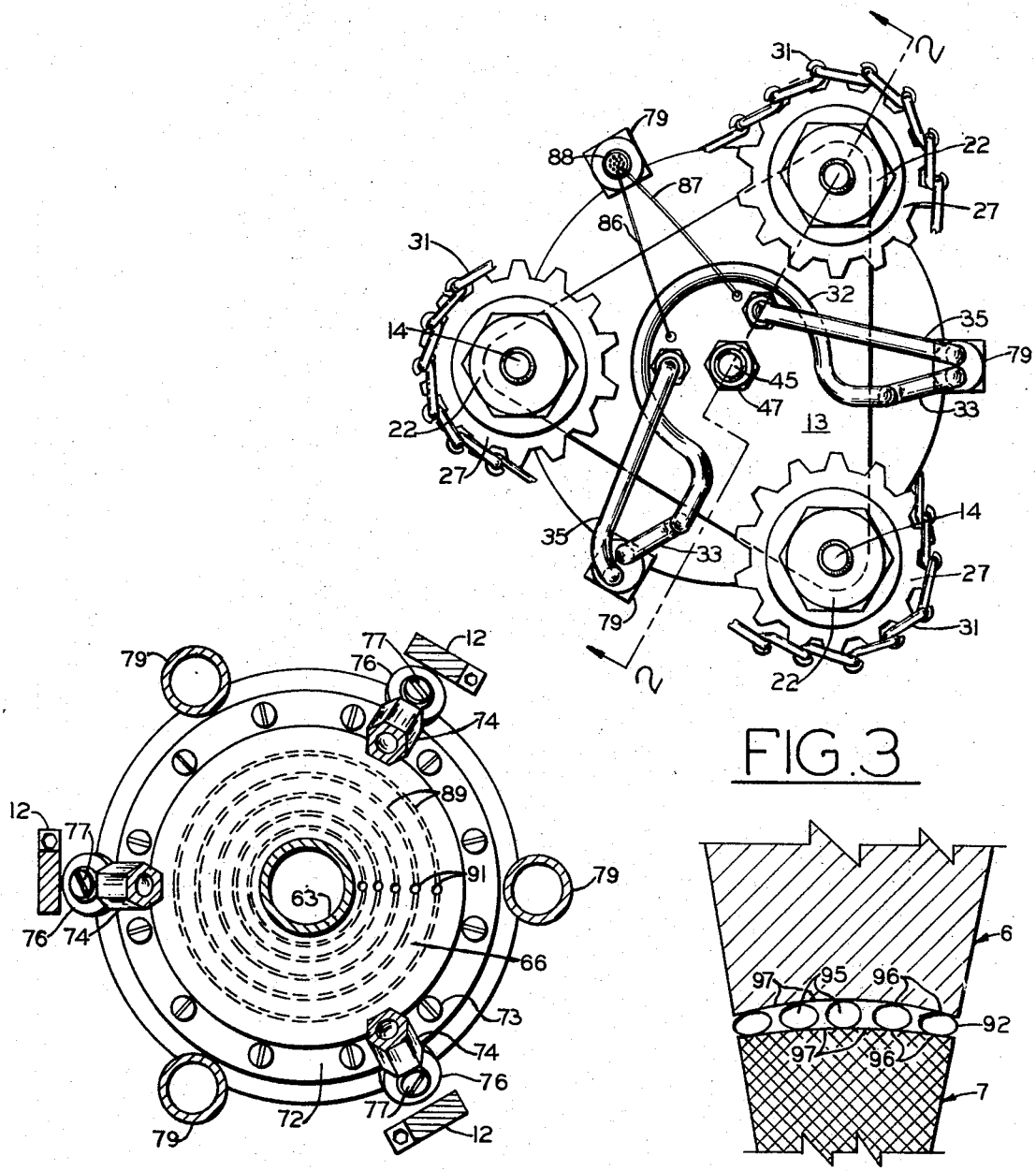
FIG. 3 is a top plan view of the apparatus of FIG. 1.
FIG. 4 is a section taken along the line 4—4 of FIG. 1.
FIG. 5 is a section along the longitudinal axis of the bar of material of known thermal characteristics, the sample and the intermediate shim.

Thermal gradients in the thermodes 6 and 8 and sample 7, where the thermodes and sample are of materials having other than a zero thermal coefficient of expansion, result in a graduated expansion in the planes normal to the longitudinal axis of the system according to the temperature at those planes. Thus where the hotter thermode 6 is uppermost and the thermal gradient declines along the axis in a descending direction, the cross section at any position along the axis of an element will be greater than that at a lower position along its axis. This results in a warpage of the originally plane surfaces of the thermodes and the sample. Further, where the coefficient of thermal expansion of the material of the thermode is different from that of the sample, the degree of warpage at the adjacent faces of those elements will differ. FIG. 5 illustrates this joint surface warpage where the gradient declines in a descending direction along the axis.

The warpage resulting from the required thermal gradient and the resultant tendency to obtain non-uniform contact and heat transfer characteristics across the thermode-sample interface is overcome by the use of a mechanically clamped joint in which all portions of the contacting surfaces are pressed into thermally intimate contact with equal pressure to make a joint which has uniform thermal resistance per unit of area. This will maintain the planes of equal temperature perpendicular to the longitudinal axis of the system and thereby avoid errors where temperatures are measured at spaced positions on the thermodes and sample to ascertain the thermal gradients therein.

Warpage is minimized by establishing curvatures at the sample and thermode faces which fit, by employing small diameter thermodes and sample, by developing a constant thermal gradient, by employing between the thermode and sample faces shims of materials which will cold flow, and by imposing adequate axial compression to insure that the surfaces conform at the thermode-sample joints to provide uniform heat transmission between the sample and the thermodes.

An apparatus utilizing these functions and providing these features is shown in the drawings. It is to be understood that the measurements are conducted in a vacuum and that the apparatus shown is enclosed by a suitable housing such as a bell jar sealed to a base and communicating with a vacuum pump, none of which is shown. In addition connections to elements external of the evacuated enclosure are made in a conventional manner (by means not shown) to enable cooling water to be circulated in elements of the apparatus, electrical connections to be made to the heater or heaters, hydraulic fluid to be introduced for compressing the sample, and electrical signals to be transmitted from thermocouples.

Figure 1:
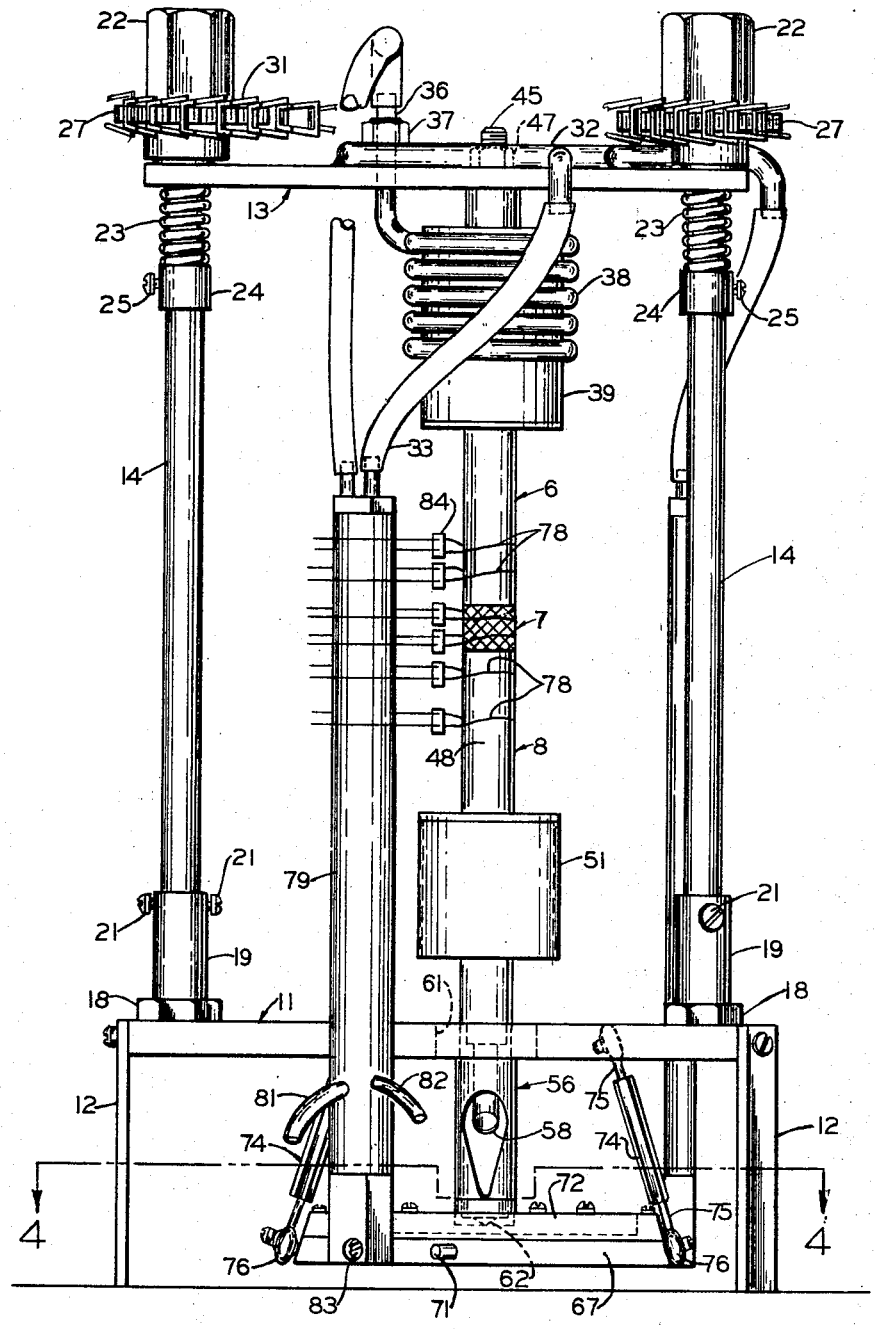
FIG. 1 is a side elevation of a portion of the apparatus of the invention with elements broken away to facilitate illustration.
Figure 2:
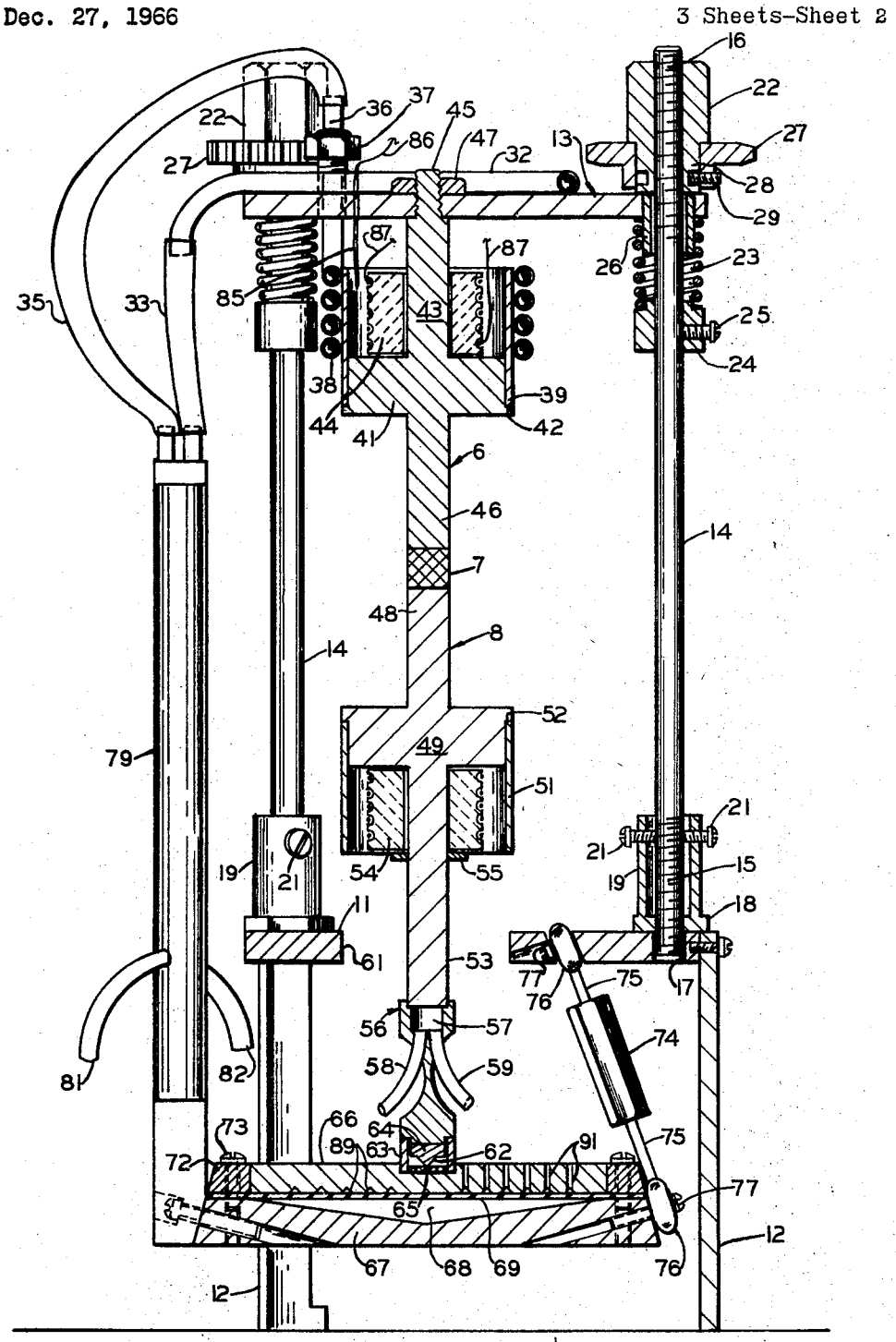
FIG. 2 is a sectioned elevation taken along the line 2—2 of FIG. 3.

As shown in FIG. 1, the measurement apparatus comprises a main platform 11 which in plan can be an equilateral triangle having each apex truncated to mount a leg 12 which extends to and is supported upon the bell jar base. An upper platform 13 also having an equilateral triangular plan is supported by rods 14 extending from the main platform 11. Rods 14 are threaded at their ends 15 and 16 so that the lower end is turned into a tapped hole 17 in the main platform 11 and locked by turning lock nut 18 against the face of the platform.

A limited degree of displacement of rods 14 from a perpendicular relationship to the main platform is afforded by sleeves 19 integral with lock nuts 18 and surrounding the rods 14. A pair of diametrically opposed screws 21 are mounted in tapped holes in the end of each sleeve 19 remote from nut 18. Preferably each lock nut is oriented in its locked position so that the screws 21 are aligned with a radius from the center of the apparatus and thus from the center of the thermal measurement system. Screws 21 impose a bending moment on rods 14 around their connection to the main platform when one screw is backed off and its mate advanced to displace the rod with respect to sleeve 19 and thus with respect to a perpendicular to platform 11. In this manner the upper and lower platforms can be adjusted in their alignment.

Upper platform 13 is supported on rods 14 by means of nuts 22 which abut the upper surface of the platform and are threaded on the upper ends 16 of the rods. Springs 23 seated against sleeves 24, secured to rods 14 by set screws 25, embrace guide sleeves 26, press fitted into suitable apertures in the upper platform 13, and bias the platform against nuts 22. Sleeves 26 permit axial movement of the rods 14. Platform 13 is perpendicular to the longitudinal axis of the thermal system. The axial spacing of platforms 11 and 13 is adjusted by rotation of nuts 22 in unison to cause them to advance or retreat along their respective rods 14. In order to couple the nuts for rotation they each are provided with a sprocket 27 suitably secured to a section of reduced diameter 28 as by a set screw 29. A chain 31 is trained around the triangular array of sprockets 27, as best seen in FIG. 3, and engages the sprocket teeth whereby the rotation of one nut 22 results in the rotation of all nuts and the displacement of platform 13 without altering its orientation to the thermal system longitudinal axis.

A cooling tube loop 32 is mounted on the upper face of upper platform 13 in intimate heat transfer relationship therewith. Cooling water is circulated through this loop from suitable flexible conduits 33 to maintain a stable thermal state for the upper platform during measurements.

An additional cooling water circuit is utilized to cool the upper thermode 6 rapidly where multiple measurements are to be made. This circuit includes the flexible conduit 35 joined to tube 36 secured in bushing 37 to pass through platform 13 to a coil of tubing 38 making several turns around thermode shield 39. Water is circulated in this circuit between measurements to increase the speed of transfer to a new thermal condition.

The thermal system is supported between the upper and lower platforms 13 and 11. Upper thermode 6 includes a massive cylindrical body 41 having a seat 42 for the lower end of heat shield 39, an upper shank 43 of reduced cross section upon which is mounted a toroidal electrical heater 44, a further reduced and threaded uppermost shank 45, and a lower shank 46 having a cross section corresponding to that of the sample to be measured. The face of the thermode which is adjacent the sample is flat at room temperature and is normal to the longitudinal axis of the thermal system. All heated surfaces are polished to reduce thermal losses. Threaded shank 45 is screwed into a hole tapped in the center of platform 13 and locked by a lock nut 47 tightened against the upper surface of the platform. Thus the upper thermode 6 is rigidly coupled to the platform 13 so that its axial location is established by the adjustment of nuts 22 and its transverse position is established by the setting of screws 21.

Lower thermode 8 is supported in axial alignment with upper thermode 6 from lower platform 11 by means of a gimbal which is focused at the thermode's upper face. The thermode comprises an upper shank 48 having a cross section corresponding to the sample to be measured, a massive body 49 upon which a heat shield 51 is seated at 52, and a lower shank 53 of reduced cross section. Its face on the end of shank 48 which is adjacent the sample is flat and normal to the axis of the system. Where it is desired to measure at a number of temperatures and with a given gradient a heater 54 is provided for the cool thermode. Heater 54 is of toroidal form and has an electrical resistance. It is maintained in shield 51 and embracing shank 53 by a flange 55 secured on shank 53. Thermode 8 is coupled to a cooling water manifold 56 including a cavity 57 for cooling water having inlet and exhaust tubes 58 and 59. Water admitted at 58 baths the end of thermode 8 and then is exhausted at 59. Suitable hoses (not shown) are coupled to tubes 58 and 59.

The lower shank 53 of thermode 8 freely passes through aperture 61 in platform 11. Thermode 8 is supported on a point 62 and is maintained centered by a sleeve 63 loosely embracing a reduced end 64 of manifold 56. A hardened insert 65 sustains point 62. The support structure is a gimbal sustaining a hydraulically actuated piston 66 supporting sleeve 63 and insert 65.

The hydraulic pressure system includes a lower pan 67 defining a cavity 68 closed by a flexible diaphragm 69 to form a chamber. A tube 71 communicates with the interior of the chamber to permit the application of controlled pressure along the axis of the thermal system by means of hydraulic force. Diaphragm 69 is maintained by a clamping ring 72 secured to pan 67 around the periphery of chamber 68 by tap screws 73. Ring 72 defines a path of reciprocation for piston 66 as the piston is displaced by flexure of diaphragm 69.

Support for pan 67 is afforded by turnbuckles 74 extending from lower platform 11 in a pattern of stable equilibrium, a triangle in the example, and having their support axes converge and thereby focus support at the center of the upper face of thermode 8 whereby the force imposed by the hydraulic system is located effectively on the longitudinal axis of the system on the thermode face at the interface between the sample 7 and thermode 8. Freedom of motion between the pan 67 and platform 11 is enhanced by journaling the threaded rods 75 of the turnbuckles by a ball and socket joint 76 to screws 77 tapped into suitable bores in the platform 11 and pan 67.

The joints are made up of spheres on screws 77 and eyes on rods 75 machined in their interior to conform to the spheres. In the platform 11 a cavity is provided for each joint structure to permit motion of the eye. The screws 77 are generally normal to the axes of the turnbuckles to provide the maximum range of motion. Adjustment of the gimbal's focus is by adjustment of the gimbal's turnbuckles 74.

Temperatures are measured by pressure contacted thermocouples 78 such as Chromel-constantan 0.005 inch wire in the form of loops held in planes normal to the axis of the thermal system and extending around the thermodes and sample. In order to assure an intimate heat transfer relationship between the thermocouples and the thermodes and sample and a mechanically stable positioning of the thermocouples thereon the thermocouples are mounted on thermocouple support rods 79. These rods provide a jacket for the cooling water tubes 81 and 82 which feed tubes 33 and 35. They are rigidly secured to pan 67 as by tap screws 83. The thermocouple loops are closed to insulators 84. Advantageously, tension can be developed between the thermocouple loops and support rods 79 by tying elastic bands (not shown) through the loops and around the rods. The several leads to the thermocouples are conveniently tied in a cable (not shown) and passed through a suitable seal to external controls.

A control thermocouple for each of the heaters 44 and 54 as couple 85 for heater 44 is provided within the shield for the heater and adjacent thereto. Electrical conductors 86 to couple 85 and conductors 87 to the element of heater 44 pass through an aperture in upper platform 13 and are cabled with the other conductors as at 88.

In the above construction the metal elements other than those of specified composition can conveniently be of brass. Where press fits are involved, soft solders can be employed to enhance the structural and thermal stability of the equipment. Conventional high vacuum techniques are employed whereby vents (not shown) are provided to all cavities as by means of small diameter bores. Entrapped gas between diaphragm 69 and piston 66 is avoided by a concentric series of grooves 89 on the under face of the piston communicating with vents 91 from the upper surface of the piston to each groove.

Several techniques are available to enhance joint conductivity depending upon the measurement parameters. Since the curvature on sample and thermode surfaces which are flat at ambient temperature resulting from an imposed axial temperature gradient is linearly related to the expansion coefficient divided by the thermal conductivity of the material, the thermode material should have a ratio of expansion coefficient to thermal conductivity as close as possible to the sample being measured. This will result in corresponding curvatures over the originally plane surfaces to be mated. Further, the sample and thermode should be of small diameter to reduce the required degree of conforming of the surfaces. Thus, a reduction in the diameter of the cylindrical system by one-half reduces the maximum separation at the joint by three-quarters (in accordance with the square law).

Thermal warpage can be reduced by reducing the total thermal gradient of the system. Thus, where thermal conductivity measurements over a range of temperatures are required, both thermodes are heated so that the entire system is raised and lowered in temperature to maintain a constant gradient at a variety of sample temperatures. This is preferable to a variable gradient across the system from a variable temperature hot sink and a constant temperature cold sink since the joints tend to maintain their fit.

As discussed above a joint fit can be enhanced by imposing pressure on the joint. Further materials and test parameters of temperature and pressure can be chosen to take advantage of cold flow to cause the surfaces to conform. At temperatures of 500° C. copper creeps fairly rapidly under pressures of 2000 p.s.i. Gallium, tin, indium and soft annealed aluminum, copper, silver, gold and platinum and their alloys flow under pressure and therefore are excellent shim material. Thus where a misfit occurs between the thermode surface and the sample a shim 92 of a soft material of high thermal conductivity between the thermode and sample will flow to afford surface confirmation as shown in FIG. 5. In FIG. 5 the shim 92 is represented in cross section as a regular pattern of discrete strands as is found in a screen. Such a pattern, when subjected to pressure sufficient to distort the individual strands 95, develops an array of alternate regions 96 of contact of the thermally conductive strands with the faces of the thermode 6 and sample 7 and regions 97 free of contact. Even where the degree of misfit between thermode and sample is severe the compression of the strands results in a substantially uniform distribution of contact regions 96 and regions 97 free of contact over the joint since the volume of the strands displaced by the compression is primarily in the bulging area between the thermode and sample. As a result the inequalities in compression of the strands across the area of the joint causes little variation in the areas of contact of the strands and therefore little variation in the thermal conductivity over the joint area. Thus in the illustration of FIG. 5 it will be noted that the radius of the arc in the cross section of the upper thermode 6 is less than that of the sample 7 so that the surfaces are closer at the edges than at the axis of the system. In this arrangement the spaced, initially circular strands 92 of the compressed shim are more compressed at the edges than near the axis. However, since the strands have their surfaces between and out of contact with the faces of the thermode and sample bowed outward, only a negligible and minor variation in the area of contact of their surfaces with the faces is observed between the edge and center regions. As a result the thermal conductivity across the joint is uniform and no distortion of thermal planes is developed at the joints. Even as the compression is increased beyond that illustrated sufficiently to flatten the strands 95 and broaden their areas 96 of contact, the degree of flattening is of the same order of magnitude across the faces of the joint and the density of contact area remains uniform.

In one type of measurement a woven copper screen 0.011 inch thick, cut in a circular form of ½ inch diameter and annealed was employed as a shim. At the measurement temperature a variation in the separation of the faces of the thermode and sample of about 0.0002 inch was satisfactorily accommodated by compressing the shim screen to an average thickness of about 0.006 inch.

The advantages of a screen can also be realized by a parallel array of uniform wire strands uniformly spaced. A foraminous structure will serve effectively. In each instance the advantage of these structures is that they provide voids into which the shim material can flow readily thereby reducing the forces required to achieve cold flow. A suitable foraminous shim is made up of copper gasoline screen. Gallium discs can be expanded by piercing with a regular array of points to provide an effective shim.

It is to be appreciated that a uniform conductivity across the opposed faces of the thermode and sample can be accomplished by a variety of shim forms wherein the flow of the shim material is such as to avoid any substantial change in the density of contact area to the thermode and/or sample. Thus if a shim is indented in a regular pattern on one face only to present a continuous face to engage either the thermode or sample and a uniform array of contact areas between the indentations on the opposite face a uniform thermal path over the joint will be realized, provided the flow of material is into the indentations in regions and the density of the contact area to the sample or thermode over the various regions of the face remains uniform.

Since many materials which cold flow to compensate for differential surface warpage can be work hardened, it is desirable to employ annealed shims and merely to hold the sample and shims between the thermodes with a clamping force until the approximate final temperatures are established in the system. When such temperatures are reached, pressure is applied to the system and the shim is conformed to the misfitting surfaces. Since the resultant cold flow in a system of small cross section will tend to cause the system to bend out of axial alignment and distort the joint compression where pressure is applied at a distance, the focused gimbal is of great advantage.

In practice thermal conductivity measurements are made by mounting a sample 7 between the thermodes 6 and 8, applying thermocouples in the proper location on the sample and thermodes, raising the temperature of one thermode above that of the other while the assembly is in a vacuum and measuring the temperatures. A typical sample is a right circular cylinder ½ inch in diameter and ½ inch long with ends flat and parallel to 0.0005 inch at ambient temperature positioned between ½ inch diameter copper thermodes. The thermode faces opposing the sample are flat at ambient temperature. Thermocouples 78 are mounted so that they each contact the sample and thermodes in a plane normal to the axis of the system and thus contact an equal temperature plane. Thermocouple separation is not critical although better results are obtained if no thermocouple is mounted on a joint. One arrangement is to employ thermodes having shanks 46 and 48 two inches long with two thermocouples on each thermode spaced ½ inch apart and with the thermocouple adjacent the joint ¼ inch therefrom. The thermocouples on the ½ inch long sample are centered longitudinally and spaced 5/16 of an inch.

With the bell jar removed nuts 22 are backed off to raise the upper thermode 6 sufficiently to permit a sample cylinder to be positioned between the thermodes in exact alignment therewith. Any misalignment is corrected by transverse shifting of the upper platform 13 by manipulation of the three sets of screws 21. With the thermodes, sample and shims (where required) in alignment nuts 22 are rotated to draw the platform 13 toward platform 11 and establish a mechanically stable system. It is assumed that the turnbuckles 74 have been adjusted so that the extensions of their longitudinal axes intersect at the center of the face of the lower thermode 8 thereby focusing the gimbal at that point.

The thermocouples which were retained on the thermodes during the setup of the sample 7 are next precisely positioned on the aligned thermal system. The bell jar then can be placed over the apparatus and the enclosure evacuated. Thereafter the temperature gradient is established by heating the upper heater 44 while cooling water is circulated through coil 32 and manifold 56. Pressure is applied to diaphragm 69 after the system has been heated to develop a uniform thermal joint at the junctions between the thermodes and the sample. With the gimbal effectively applying the force at the lower joint to the sample, high pressure can be applied without cocking the system and good joints formed. With an 8 square inch diaphragm 69 the application of a hydraulic pressure of fifty pounds per square inch results in a force of 400 pounds imposed at the thermode-sample joints, about 2000 pounds per square inch on the ½ inch diameter joints. Such pressure will cause flow at the joints where appropriate materials are employed so that a uniform thermal conductivity is afforded.

The measurement has an accuracy of plus or minus 5% at temperatures up to 500° C. without additional precautions to avoid radiation losses. In the usual test conditions the sample is clamped between copper shimmed metal thermode bars whose ends are kept flat to 3 fringes. At the measurement temperature and in a vacuum of $10^{-4}$ mm. of Hg or less a pressure of 2000 pounds per square inch is imposed.

It is to be understood that various modifications of the method of measuring thermal conductivity and of the apparatus of this invention are apparent to those skilled in the art. Thus measurements need not be made in a vacuum and instead can be performed in inert gases or other special atmospheres, particularly at measurement temperatures above 500° C. While round cross sections have been discussed for the thermodes and sample other sections offering symmetry around a longitudinal axis can be employed. The mating faces of the thermodes and sample need not be flat. Thermodes of iron or other materials of known thermal conductivity can be employed. High temperature measurements can be shielded for radiation as by a tubular shield spaced radially from and embracing the sample and the adjacent portions of the thermodes. Further shielding can be provided as powdered insulation surrounding and embedding the sample and its adjacent thermode portions. The gimbal focus can be in the vicinity of the sample rather than at the face of the thermode it supports. Thus it is to be appreciated that various combinations of these variations can be utilized without departing from the spirit and scope of the invention.

Having described the invention, I claim:

1. In the method of measuring thermal conductivity of material by the cut bar method wherein a sample is mounted in longitudinal alignment between a hot thermode and a cold thermode longitudinally aligned with the hot thermode and temperatures at several planes normal to the longitudinal axis of said sample and thermodes are measured the steps of mounting said sample between said thermodes, developing a temperature gradient between said hot thermode and said cold thermode across said sample which gradient approximates that of the measurement conditions, then applying pressure sufficient to form joints between the thermodes and the sample having a uniform thermal conductivity across their face, establishing thermal equilibrium in the thermodes and sample, and measuring said temperatures.

2. The method according to claim 1 wherein said applied pressure is of a magnitude sufficient to induce cold flow to form said joints.

3. The method according to claim 2 including the step of mounting a shim of a soft metal having a high thermal conductivity between each thermode and said sample, whereby cold flow is induced in said shim to conform to the opposed thermode and sample faces.

4. In an apparatus for measuring thermal conductivity by the cut bar method including a thermal system comprising a hot thermode in thermal communication with a sample to be measured and which is in thermal communication with a cold thermode, an enclosure for said system, and means to measure temperatures of said system at spaced locations, the improvement which comprises a means for applying force to said system in a direction to press said thermodes toward said sample and of a magnitude sufficient to cause opposed surfaces in said system to conform to each other at the measuring temperature by inducing cold flow at at least one of said surfaces.

5. A combination according to claim 4 wherein said sample and said hot and cold thermodes in the regions adjacent said sample are symmetrical around longitudinal axes and are of essentially identical cross-section normal to said axes; means for maintaining a first one of said thermodes with its axis aligned with the aligned axes of said sample and said second thermode to form a common longitudinal axis; a platform supporting the end of said second thermode remote fro msaid sample; a fixed base; and a plurality of suspension elements from said base to said platform arrayed in a pattern of stable equilibrium with their axes of suspension converging at the common longitudinal axis in the vicinity of said sample.

6. A combination according to claim 5 wherein said force imposing means is a hydraulic chamber mounted on said platform, a wall for said chamber displaceable toward and away from said sample along said common axis in response to the application of hydraulic pressure, and including means to couple mechanically said wall and said second thermode at its end remote from said sample.

7. A combination according to claim 4 including a shim of metal which will cold flow at measurement temperatures positioned between each thermode and said sample whereby said shim conforms to said opposed thermode and sample surfaces to provide an essentially uniform thermal conductivity over all of said opposed surfaces.

8. A joint according to claim 7 wherein said shim is made up of an array of substantially uniformly spaced contact elements of substantially uniform area at at least one of said element and sample surfaces.

9. A joint according to claim 7 wherein said shim is sheetlike, foraminous metal having a uniform array of contact areas and areas of no contact at at least one of said element and sample surfaces.

10. In an apparatus according ot claim 7 wherein at least one of said thermodes is of a soft metal the improvement comprising a hardened face on the end of said soft metal thermode whereby cold flow of said thermode face at the joint is avoided.

References Cited

UNITED STATES PATENTS 3,263,485  9/1966  Mahmoodi _____ 73—15

RICHARD C. QUEISSER, Primary Examiner

J. K. LUNSFORD, Assistant Examiner